United States Patent
Zhang et al.

(10) Patent No.: US 11,441,072 B2
(45) Date of Patent: *Sep. 13, 2022

(54) LIQUID CRYSTAL COMPOSITION, LIQUID CRYSTAL DISPLAY ELEMENT, AND LIQUID CRYSTAL DISPLAY

(71) Applicant: Shijiazhuang Chengzhi Yonghua Display Material Co., Ltd., Hebei (CN)

(72) Inventors: Wei Zhang, Hebei (CN); Sumin Kang, Hebei (CN); Xiaolong Wang, Hebei (CN); YunXia Qiao, Hebei (CN); Qing Cui, Hebei (CN); Gang Wen, Hebei (CN)

(73) Assignee: SHIJIAZHUANG CHENGZHI YONGHUA DISPLAY MATERIAL CO., LTD., Hebei (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/251,041

(22) PCT Filed: Apr. 3, 2020

(86) PCT No.: PCT/CN2020/083218
§ 371 (c)(1),
(2) Date: Dec. 10, 2020

(87) PCT Pub. No.: WO2021/134963
PCT Pub. Date: Jul. 8, 2021

(65) Prior Publication Data
US 2021/0301205 A1    Sep. 30, 2021

(30) Foreign Application Priority Data

Dec. 30, 2019   (CN) .......................... 201911397807.2

(51) Int. Cl.
| | | |
|---|---|---|
| *G02F 1/1333* | (2006.01) | |
| *C09K 19/30* | (2006.01) | |
| *C09K 19/12* | (2006.01) | |
| *C09K 19/34* | (2006.01) | |

(52) U.S. Cl.
CPC .......... *C09K 19/3003* (2013.01); *C09K 19/12* (2013.01); *C09K 19/3405* (2013.01); *C09K 19/3491* (2013.01); *C09K 2019/122* (2013.01); *C09K 2019/123* (2013.01); *C09K 2019/301* (2013.01); *C09K 2019/3004* (2013.01); *C09K 2019/3408* (2013.01)

(58) Field of Classification Search
CPC .... C09K 19/3003; C09K 19/44; C09K 19/12; C09K 19/3405; C09K 19/3491; C09K 19/3098; C09K 2019/122; C09K 2019/123; C09K 2019/3004; C09K 2019/301; C09K 2019/3408; C09K 2019/3066; C09K 2019/3016; C09K 2019/3027; G02F 1/1333
See application file for complete search history.

(56) References Cited

U.S. PATENT DOCUMENTS

| | | |
|---|---|---|
| 2017/0226423 A1 | 8/2017 | Saito |
| 2021/0355382 A1* | 11/2021 | Liang .................. C09K 19/3066 |

FOREIGN PATENT DOCUMENTS

| | | |
|---|---|---|
| CN | 103215046 A | 7/2013 |
| CN | 105384638 A | 3/2016 |
| CN | 105829496 A | 8/2016 |
| CN | 107257839 A | 10/2017 |
| WO | WO-2019206788 A1 | 10/2019 |
| WO | WO-2019206789 A1 | 10/2019 |

* cited by examiner

*Primary Examiner* — Geraldina Visconti
(74) *Attorney, Agent, or Firm* — Muncy, Geissler Olds & Lowe, P.C.

(57) ABSTRACT

A dielectric negative liquid crystal composition, a liquid crystal display element and a liquid crystal display containing the liquid crystal composition belong to the field of liquid crystal display. The liquid crystal composition of the present disclosure includes a compound represented by formula I, a compound represented by formula II, two or more compounds represented by formula III and one or more compounds represented by formula IV. The liquid crystal composition of the present invention has high dielectric anisotropy, high elastic constant K, low rotational viscosity, can be used to develop large dielectric, fast response liquid crystal display elements or liquid crystal displays.

I

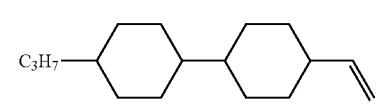

II

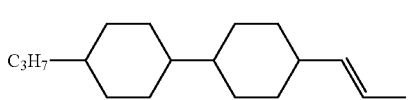

III

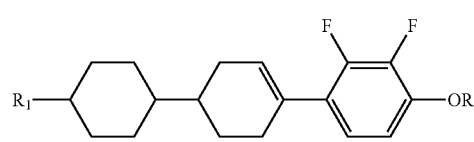

IV

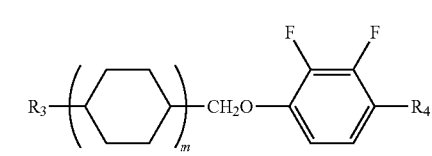

8 Claims, No Drawings

LIQUID CRYSTAL COMPOSITION, LIQUID CRYSTAL DISPLAY ELEMENT, AND LIQUID CRYSTAL DISPLAY

TECHNICAL FIELD

The present invention belongs to the field of liquid crystal display, and more specifically, relates to a liquid crystal composition, a liquid crystal display element or a liquid crystal display containing the liquid crystal composition.

BACKGROUND ART

According to the display mode, liquid crystal display elements are divided into the following modes: twisted nematic (TN) mode, super twisted nematic (STN) mode, in-plane mode (IPS), and vertical alignment (VA) mode. Regardless of the display mode, the liquid crystal composition needs the following characteristics:

(1) stable chemical and physical properties; (2) low viscosity; (3) suitable dielectric $\Delta\varepsilon$; (4) suitable refractive index $\Delta n$; (5) good miscibility with other liquid crystal compounds.

Early commercial TFT-LCD products basically adopt TN display mode, and its biggest problem is narrow viewing angle. With the increase of product size, especially in the field of TV, IPS display mode and VA display mode with wide view angle are developed and applied in turn.

In addition, the liquid crystal medium used in the display elements of FFS mode, IPS mode and VA mode is not perfect. For the liquid crystal materials used in the display devices, it is required to have ① low driving voltage: the liquid crystal material has appropriate negative dielectric anisotropy and elastic coefficient K; ② fast response: the liquid crystal material has appropriate rotational viscosity $\gamma_1$ and elastic coefficient K; ③ high reliability: high charge retention rate, high specific resistance value, excellent high temperature stability and strict requirements for the stability of UV light or conventional backlight lighting.

A liquid crystal display element containing a liquid crystal composition with a large absolute value of dielectric anisotropy can reduce the base voltage value, reduce the driving voltage, and further reduce the power consumption. The liquid crystal display element of the liquid crystal composition with a lower threshold voltage can effectively reduce the power consumption of the display, especially in consumables, such as mobile phones, tablet computers and other portable electronic products, which have longer battery life.

With the development of LCD technology, the response speed of LCD products is required to be higher and higher. In addition to the device manufacturers to improve the response speed by reducing the cell thickness d, the response speed of our liquid crystal materials also needs to be improved in practical applications. The response speed of liquid crystal materials in the prior art is limited by the rotational viscosity $\gamma_1$/elastic constant K of liquid crystals. Therefore, in order to achieve rapid response, it is necessary to try every means to reduce the rotational viscosity $\gamma_1$ of liquid crystal materials and increase its elastic constant K. However, in the actual research, it is found that the rotational viscosity and the elastic constant are a pair of contradictory parameters, when the rotational viscosity is reduced, the elastic constant will decrease, and the response time can not be reduced. Therefore, the development of a liquid crystal composition with a faster response speed has become a difficult problem.

SUMMARY OF THE INVENTION

In order to solve at least one of the above-mentioned problems, the inventors have conducted in-depth studies and found that the liquid crystal composition of the present invention has high dielectric anisotropy, high K value, and low rotational viscosity, thus completing the present invention.

To achieve the above objective, the present disclosure adopts the following technical solutions:

The present invention relates to a liquid crystal composition, which comprises a compound of formula I, a compound of formula II, two or more compounds of formula III, and one or more compounds of formula IV:

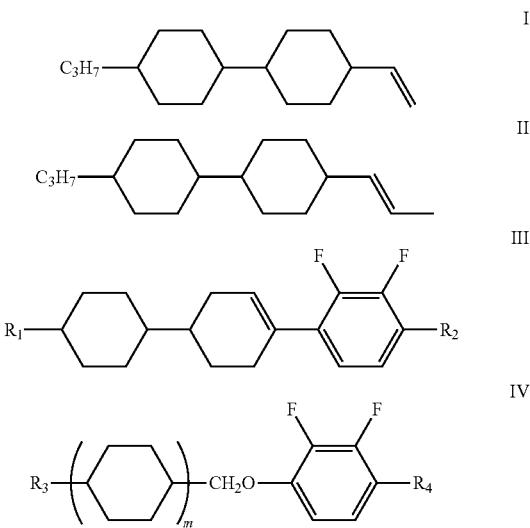

wherein $R_1$, $R_2$, $R_3$ an $R_4$ each independently represent an alkyl group having a carbon atom number of 1-5, a fluoro-substituted alkyl group having a carbon atom number of 1-5, an alkoxy group having a carbon atom number of 1-5, or a fluoro-substituted alkoxy group having a carbon atom number of 1-5;

any one or more non-connected $CH_2$ in $R_1$, $R_2$, $R_3$ and $R_4$ may be substituted with cyclopentyl, cyclobutyl or cyclopropyl;

m represents 1 or 2.

The liquid crystal composition of the present invention effectively controls the growth of the rotational viscosity of the composition while increasing the dielectric anisotropy and K value of the composition, and realizes that the composition has the characteristics of high dielectric anisotropy, high K value and low rotational viscosity.

The present invention also relates to a liquid crystal display element, which comprises a liquid crystal composition of the present invention, and the liquid crystal display element is an active matrix display element or a passive matrix display element.

The present invention also relates to a liquid crystal display, which comprises a liquid crystal composition of the present invention, and the liquid crystal display is an active matrix display or a passive matrix display.

DETAILED DESCRIPTION OF EMBODIMENTS

[Liquid Crystal Composition]

The liquid crystal composition of the present disclosure comprises a compound of formula I, a compound of formula II, two or more compounds of formula III, and one or more compounds of formula IV:

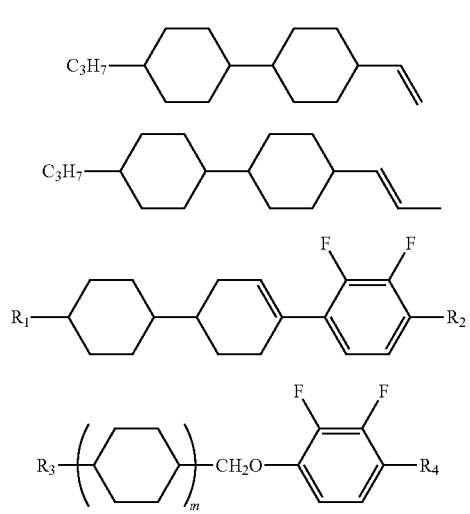

wherein $R_1$, $R_2$, $R_3$ and $R_4$ each independently represent an alkyl group having a carbon atom number of 1-5, a fluoro-substituted alkyl group having a carbon atom number of 1-5, an alkoxy group having a carbon atom number of 1-5, or a fluoro-substituted alkoxy group having a carbon atom number of 1-5;

any one or more non-connected $CH_2$ in $R_1$, $R_2$, $R_3$ and $R_4$ may be substituted with cyclopentyl, cyclobutyl or cyclopropyl;

m represents 1 or 2.

The technical solution of the present disclosure has high dielectric anisotropy, high K value, and low rotational viscosity, and can reduce the threshold voltage and response time of the liquid crystal composition.

As the above-mentioned alkyl group having a carbon atom number of 1-5, for example, methyl, ethyl, n-propyl, isopropyl, n-butyl, isobutyl, tert-butyl, n-pentyl, isopentyl and so on.

As the above-mentioned alkoxy group having a carbon atom number of 1-5, for example, a methoxy group, an ethoxy group, or a propoxy group.

As the above-mentioned fluoro-substituted alkyl group having a carbon atom number of 1-5, and fluoro-substituted alkoxy group having a carbon atom number of 1-5; the "fluorine substitution" can be mono-fluorine substitution, difluorine substitution, or trifluorine substitution, such polyfluorine substitution may also be perfluorine substitution, and the number of fluorine substitution is not particularly limited. For example, examples of fluorine-substituted alkyl groups with a carbon atom number of 1-5 include fluoromethyl, difluoromethyl, trifluoromethyl, 1-fluoroethyl, 2-fluoroethyl, 1,2-difluoroethyl, 1,1-difluoroethyl, trifluoromethoxy, etc. but not limited thereto.

In the liquid crystal composition of the present disclosure, preferably, the compound of formula III is selected from the group consisting of the compounds of the following formulas III-1 to III-9:

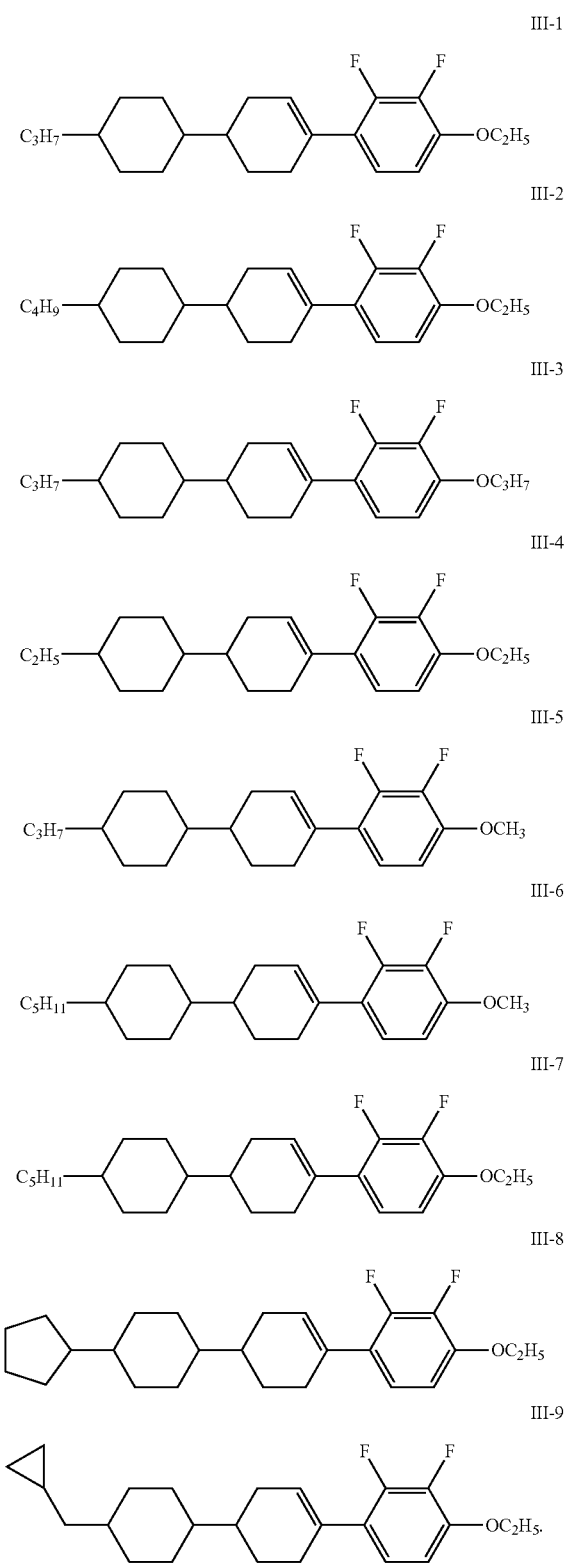

The compound of formula III has negative dielectric anisotropy. By including the compound of formula III in the liquid crystal composition of the present disclosure, the driving voltage of the liquid crystal composition can be adjusted.

In the liquid crystal composition of the present disclosure, preferably, the compound of formula IV is selected from the group consisting of the compounds of the following formulas IV-1 to IV-6:

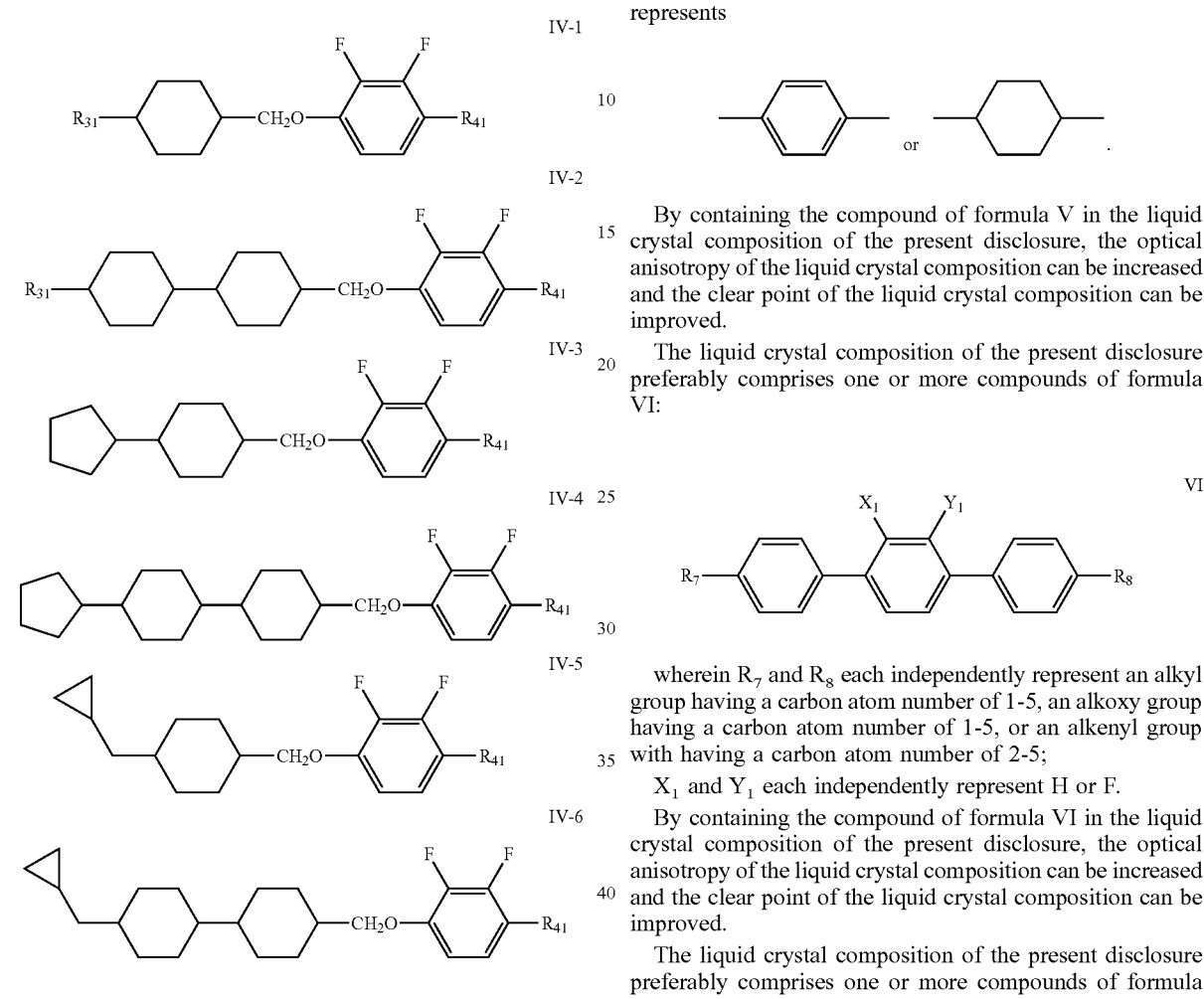

wherein $R_{31}$ and $R_{41}$ each independently represent an alkyl group having a carbon atom number of 1-5 or an alkoxy group having a carbon atom number of 1-5.

The compound of formula IV has negative dielectric anisotropy. By including the compound of formula IV in the liquid crystal composition of the present disclosure, the driving voltage of the liquid crystal composition can be adjusted.

The liquid crystal composition of the present disclosure preferably comprises one or more compounds of formula V:

wherein $R_5$ and $R_6$ each independently represent an alkyl group having a carbon atom number of 1-5, an alkoxy group having a carbon atom number of 1-5, or an alkenyl group having a carbon atom number of 2-5;

represents

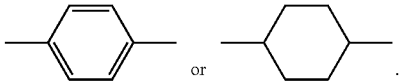

By containing the compound of formula V in the liquid crystal composition of the present disclosure, the optical anisotropy of the liquid crystal composition can be increased and the clear point of the liquid crystal composition can be improved.

The liquid crystal composition of the present disclosure preferably comprises one or more compounds of formula VI:

wherein $R_7$ and $R_8$ each independently represent an alkyl group having a carbon atom number of 1-5, an alkoxy group having a carbon atom number of 1-5, or an alkenyl group with having a carbon atom number of 2-5;

$X_1$ and $Y_1$ each independently represent H or F.

By containing the compound of formula VI in the liquid crystal composition of the present disclosure, the optical anisotropy of the liquid crystal composition can be increased and the clear point of the liquid crystal composition can be improved.

The liquid crystal composition of the present disclosure preferably comprises one or more compounds of formula VII:

wherein $R_9$ and $R_{10}$ each independently represent an alkyl group having a carbon atom number of 1-5, an alkoxy group having a carbon atom number of 1-5, or an alkenyl group with having a carbon atom number of 2-5.

By containing a compound of formula VII in the liquid crystal composition of the present disclosure, the optical anisotropy of the liquid crystal composition can be increased to match a lower cell thickness, thus achieving a faster response speed.

In the liquid crystal composition of the present disclosure, preferably, the compound of formula VII is selected from the group consisting of the compounds of the following formulas VII-1 to VII-7:

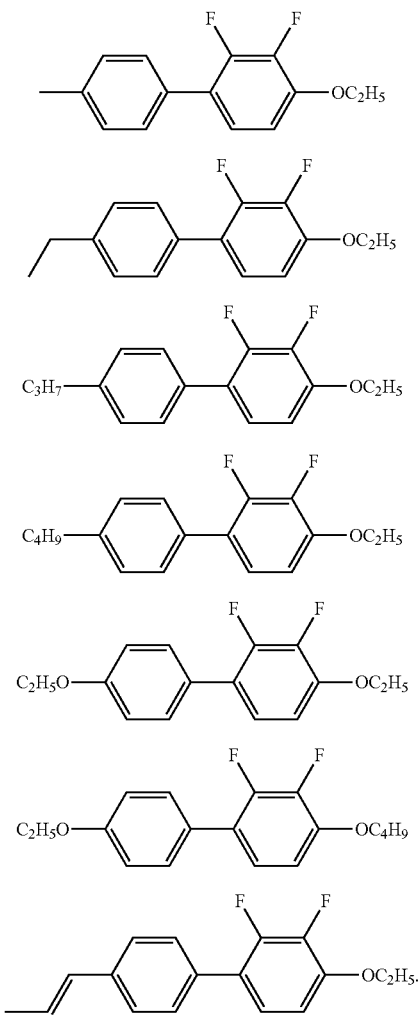

VII-1
VII-2
VII-3
VII-4
VII-5
VII-6
VII-7

The liquid crystal composition of the present disclosure preferably comprises one or more compounds of formula VIII:

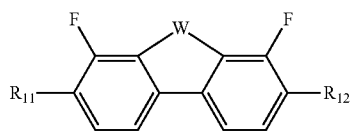

VIII wherein $R_{11}$ represents an alkyl group having a carbon atom number of 1-5, an alkoxy group having a carbon atom number of 1-5, or an alkenyl group having a carbon atom number of 2-5, any one or more non-connected $CH_2$ may be substituted with cyclopentyl, cyclobutyl or cyclopropyl;

$R_{12}$ represents an alkyl group having a carbon atom number of 1-5, an alkoxy group having a carbon atom number of 1-5, or an alkenyl group having a carbon atom number of 2-5;

W represents O or S.

By containing the compound of formula VIII in the liquid crystal composition of the present disclosure, the dielectric anisotropy of the liquid crystal composition can be increased and the response speed of the liquid crystal composition can be improved.

In the liquid crystal composition of the present disclosure, preferably, the compound of formula VIII is selected from the group consisting of the compounds of the following formulas VIII-1 to VIII-9:

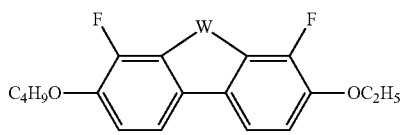

VIII-1

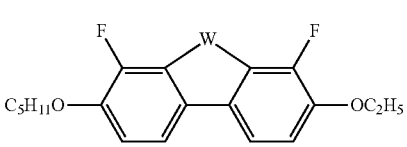

VIII-2

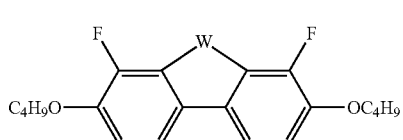

VIII-3

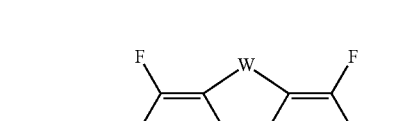

VIII-4

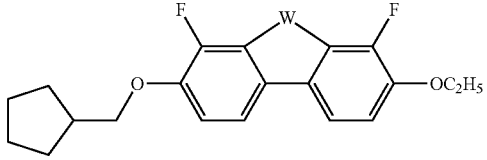

VIII-5

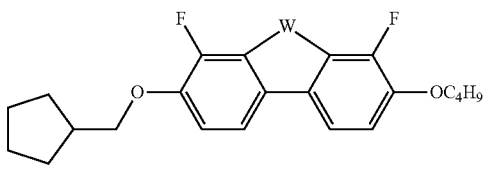

VIII-6

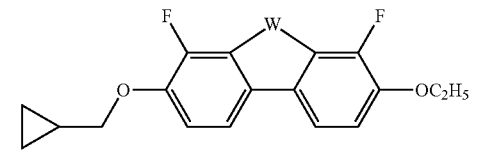

VIII-7

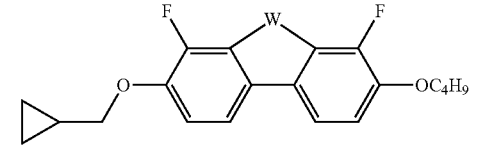

VIII-8

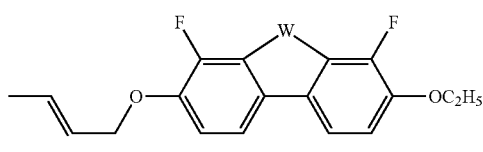

-continued

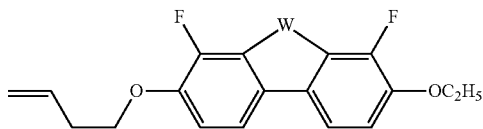

VIII-9

W represents O or S.

The liquid crystal composition of the present disclosure preferably comprises one or more compounds of formula IX:

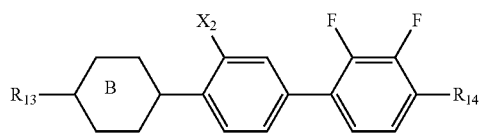

IX wherein $R_{13}$ and $R_{14}$ each independently represent an alkyl group having a carbon atom number of 1-5, an alkoxy group having a carbon atom number of 1-5, or an alkenyl group having a carbon atom number of 2-5.

represents

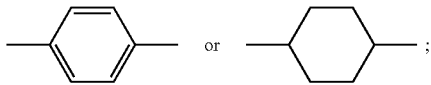

;

$X_2$ represents H or F.

By containing the compound of formula IX in the liquid crystal composition of the present disclosure, the dielectric anisotropy of the liquid crystal composition can be increased, and the clearing point of the liquid crystal composition can be improved.

In the liquid crystal composition of the present disclosure, preferably, the compound of formula IX is selected from the group consisting of the compounds of the following formulas IX-1 to IX-3:

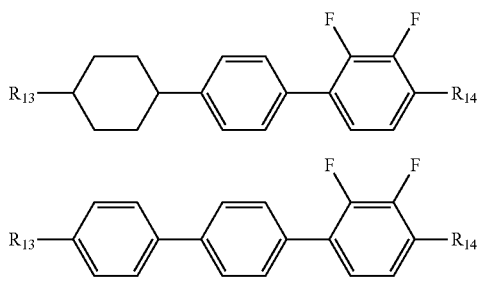

IX-1

IX-2

-continued

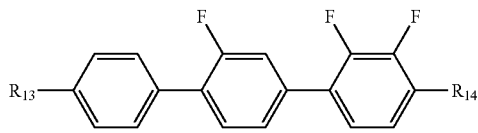

IX-3 wherein $R_{13}$ and $R_{14}$ each independently represent an alkyl group having a carbon atom number of 1-5, an alkoxy group having a carbon atom number of 1-5, or an alkenyl group having a carbon atom number of 2-5.

In the liquid crystal composition of the present disclosure, preferably, the liquid crystal composition further comprises one or more compounds of formula X other than the compounds of formula I and formula II:

X wherein $R_{15}$ and $R_{16}$ each independently represent an alkyl group having a carbon atom number of 1-5, an alkoxy group having a carbon atom number of 1-5, or an alkenyl group having a carbon atom number of 2-5;

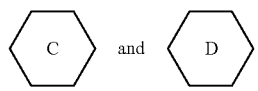

each independently represent

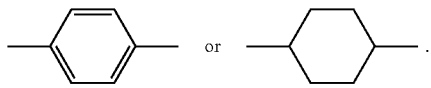

.

By including the compound of formula X in the liquid crystal composition of the present disclosure, the response speed of the liquid crystal composition can be improved.

In the liquid crystal composition of the present disclosure, preferably, the compound of formula X other than the compounds of formula I and formula II is selected from the group consisting of the compounds of the following formulas X-1 to X-8:

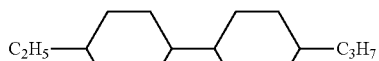

X-1

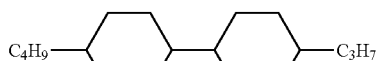

X-2

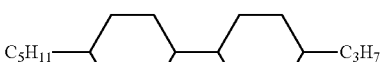

X-3

-continued

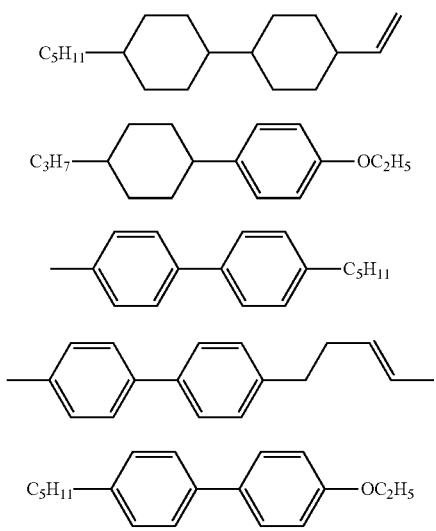

X-4

X-5

X-6

X-7

X-8

In the liquid crystal composition of the present disclosure, the addition amount (mass ratio) of the compound of formula I in the liquid crystal composition is 1-50%, preferably 20-45%; the addition amount (mass ratio) of the compound of formula II in the liquid crystal composition is 1-20%, preferably 1-15%; the addition amount (mass ratio) of the compound of formula III in the liquid crystal composition is 1-30%, preferably 5-18%; the addition amount (mass ratio) of the compound of formula IV in the liquid crystal composition is 1-45%, preferably 5-30%; the addition amount (mass ratio) of the compound of formula V in the liquid crystal composition is 0-25%, preferably 3-15%; the addition amount (mass ratio) of the compound of formula VI in the liquid crystal composition is 0-10%, preferably 1-15%; the addition amount (mass ratio) of the compound of formula VII in the liquid crystal composition is 0-30%, preferably 5-20%; the addition amount (mass ratio) of the compound of formula VIII in the liquid crystal composition is 0-30%, preferably 5-20%; the addition amount (mass ratio) of the compound of formula IX in the liquid crystal composition is 0-15%, preferably 3-10%; the addition amount (mass ratio) of the compound of formula X in the liquid crystal composition is 0-45%, Preferably 0-20%.

In the liquid crystal composition of the present disclosure, optionally, dopants with various functions can be added. In the case of dopants, the content of the dopants preferably accounts for 0.01-1.5% by mass in the liquid crystal composition. Examples of these dopants include antioxidants, ultraviolet absorbers, and chiral agents.

Antioxidants can be listed as follows,

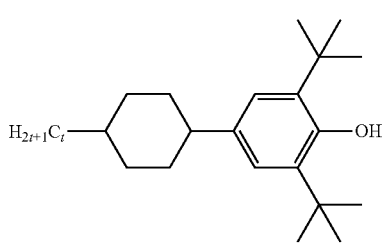

-continued

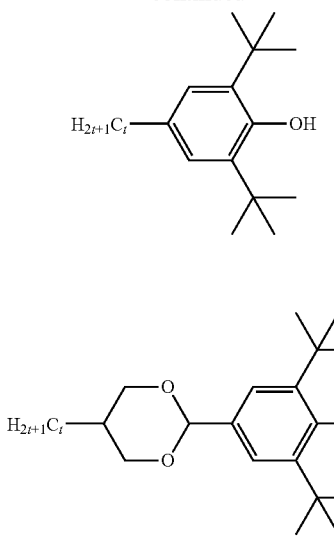

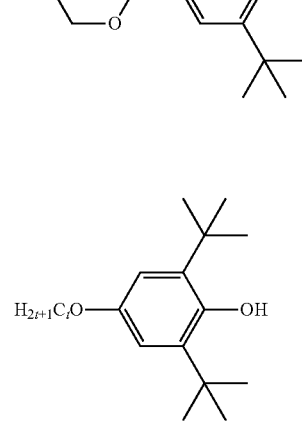

$t$ is an integer from 1 to 10;

chiral agents can be listed as follows,

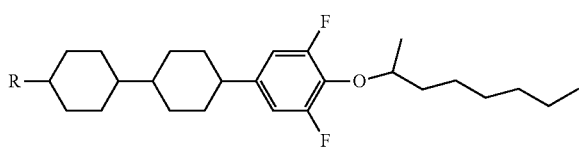

R represents an alkylene group having a carbon atom number of 1-10;

light stabilizers can be listed as follows,

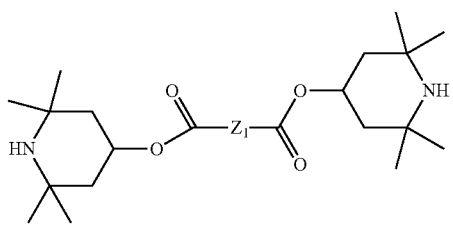

$Z_1$ represents an alkylene group having a carbon atom number of 1-20, wherein any one or more hydrogens in the alkylene group may be substituted with halogen, and any one or more non-connected $CH_2$ in the alkylene group may be substituted by oxygen;

UV absorbers can be listed as follows,

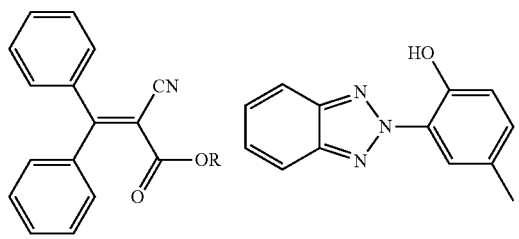

R represents an alkyl group having a carbon atom number of 1-10.

[Liquid Crystal Display Element or Liquid Crystal Display]

The present disclosure also relates to a liquid crystal display element or liquid crystal display, the liquid crystal display element or liquid crystal display comprises any one of the above liquid crystal compositions; the liquid crystal display element or liquid crystal display is an active matrix display element or display or a passive matrix display element or display.

Optionally, the liquid crystal display element or liquid crystal display is preferably an active matrix liquid crystal display element or liquid crystal display.

Optionally, the active matrix display element or display is an IPS-TFT, FFS-TFT, or VA-TFT liquid crystal display element or display.

The liquid crystal display element or liquid crystal display containing the above-mentioned compound or liquid crystal composition has a lower threshold voltage and a faster response speed.

EMBODIMENTS

In order to illustrate the present invention more clearly, the present invention will be further described below in conjunction with preferred examples. A person skilled in the art should understand that the following detailed description is illustrative rather than limiting, and should not limit the scope of the invention.

In the present specification, unless otherwise specified, the percentages are mass percentages, the temperatures are in degree Celsius (° C.), and the specific meanings of other symbols and the test conditions are as follows:

Cp represents the clearing point (° C.) of the liquid crystal measured by a DSC quantitative method;

$\Delta n$ represents the optical anisotropy, $n_o$ is the refractive index of an ordinary light, $n_e$ is the refractive index of an extraordinary light, the test condition is 25±2° C. and 589 nm, and an abbe refractometer is used for the test;

$\Delta\varepsilon$ represents the dielectric anisotropy, $\Delta\varepsilon=\varepsilon_\parallel-\varepsilon_\perp$, wherein ii is a dielectric constant parallel to a molecular axis, and $\varepsilon_\perp$ is a dielectric constant perpendicular to the molecular axis, the test condition is 25±0.5° C., a 20 micron parallel cell is used, and INSTEC: ALCT-IR1 is used for the test;

$\gamma_1$ represents a rotary viscosity (mPa·s), the test condition is 25±0.5° C., a 20 micron parallel cell is used, and INSTEC: ALCT-IR1 is used for the test;

$K_{11}$ represents the torsion elastic constant, $K_{33}$ represents the splay elastic constant, the test conditions is 25° C., INSTEC: ALCT-IR1, and a 20 micron parallel cell is used;

The method for preparing a liquid crystal medium comprises the following steps: each liquid crystal monomer is weighed according to a certain ratio and then put into a stainless steel beaker, the stainless steel beaker containing each liquid crystal monomer is placed on the magnetic stirrer, heated and melted. After most of the liquid crystal monomer in the stainless steel beaker is melted, a magnetic rotor is added to the stainless steel beaker for uniformly stirring the liquid crystal mixture, and the mixture is cooled to room temperature to obtain the liquid crystal medium.

In the examples of the present invention, liquid crystal monomer structures are represented by codes, and the codes for ring structures, end groups and linking groups of liquid crystals are represented as in Tables 1 and 2 below.

TABLE 1

Codes corresponding to cyclic structures

| Cyclic structure | Corresponding code |
|---|---|
| 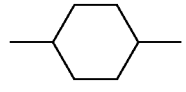 | C |
| 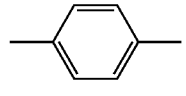 | P |
| 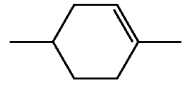 | L |
| 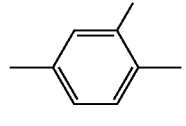 | G |
| 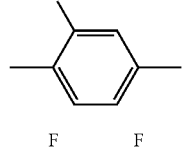 | Gi |
| 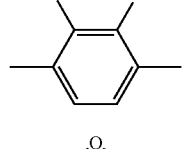 | Y |
| 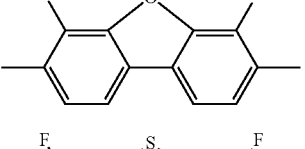 | Sb |
| 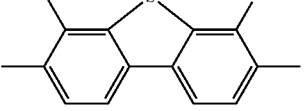 | Sc |

TABLE 2

Codes corresponding to end groups and linking groups

| End group and linking group | Corresponding code |
|---|---|
| $C_nH_{2n+1}$— | n- |
| $C_nH_{2n+1}O$— | nO— |
| —$CF_3$ | —T |
| —$OCF_3$ | —OT |

TABLE 2-continued

| Codes corresponding to end groups and linking groups | |
|---|---|
| End group and linking group | Corresponding code |
| —CH₂O— | —O— |
| —F | —F |
| —CH₂CH₂— | —E— |
| —CH=CH— | —V— |
| —CH=CH—CₙH₂ₙ₊₁ | Vn— |
| 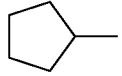 | Cp- |
|  | Cpr- |
|  | Cpr1- |
| 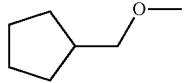 | CpO |
| 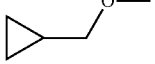 | CprO |

For example:

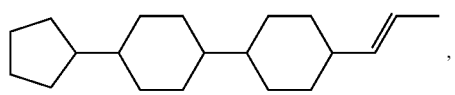 [SMILES: C/C=C/C1CCC(C2CCC(C3CCCC3)CC2)CC1]

the code is CC-Cp-V1;

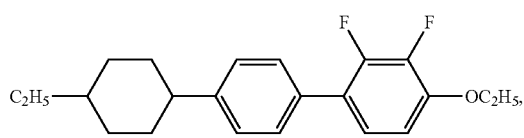 [SMILES: CCOc1ccc(-c2ccc(C3CCC(CC)CC3)cc2)c(F)c1F]

the code is CPY-2-O2;

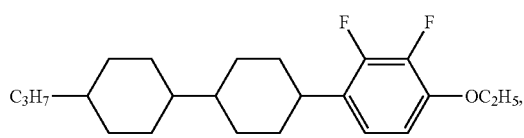

the code is CCY-3-O2;

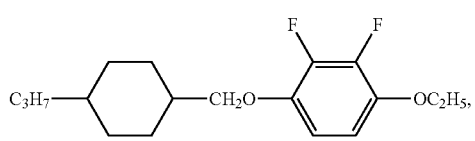

the code is COY-3-O2;

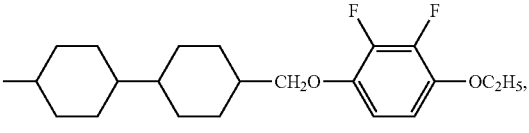

the code is CCOY-3-O2;

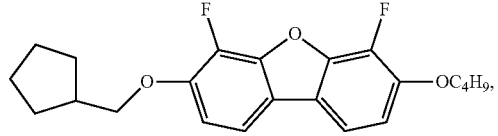

the code is Sb-CpO-O4;

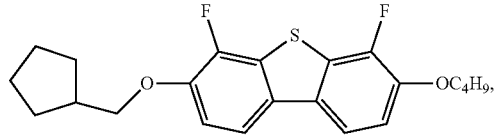

the code is Sc-CpO-O4.

Example 1

The formulation and corresponding properties of the liquid crystal composition are as shown in table 3 below.

TABLE 3

Formulation and corresponding properties of liquid crystal composition of Example 1

| Category | Liquid crystal monomer code | Content (%) |
|---|---|---|
| I | CC-3-V | 36 |
| II | CC-3-V1 | 2 |
| III | CLY-3-O2 | 8 |
| III | CLY-4-O2 | 7 |
| III | CLY-3-O3 | 7 |
| IV | COY-3-O2 | 12.5 |
| V | CPP-1V-2 | 10 |
| VIII | Sc-CpO-O4 | 9 |
| VIII | Sc-CpO-O4 | 6 |
| X | PP-1-2V1 | 2.5 |

Δε[1 KHz, 25° C.]: −4.2
Δn[589 nm, 25° C.]: 0.108
Cp: 80° mC.
γ₁: 82 mPa · s
K₁₁: 16.0
K₃₃: 14.4

Example 2

The formulation and corresponding properties of the liquid crystal composition are as shown in table 4 below.

TABLE 4

Formulation and corresponding properties of liquid crystal composition of Example 2

| Category | Liquid crystal monomer code | Content (%) |
|---|---|---|
| I | CC-3-V | 35.5 |
| II | CC-3-V1 | 4.5 |
| III | CLY-3-O2 | 8 |
| III | CLY-4-O2 | 6 |
| III | CLY-3-O3 | 6 |
| IV | COY-3-O2 | 8 |
| V | CPP-3-2 | 3 |
| VII | PY-3-O2 | 12 |
| IX | CPY-3-O2 | 10 |
| IX | CPY-2-O2 | 7 |

$\Delta\epsilon$[1 KHz, 25° C.]: −3.8
$\Delta$n[589 nm, 25° C.]: 0.103
Cp: 80° C.
$\gamma_1$: 78 mPa · s
$K_{11}$: 13.2
$K_{33}$: 14.8

Comparative Example 1

The formulation and corresponding properties of the liquid crystal composition are as shown in table 5 below.

TABLE 5

Formulation and corresponding properties of liquid crystal composition of Comparative Example 1

| Category | Liquid crystal monomer code | Content (%) |
|---|---|---|
| I | CC-3-V | 30 |
|  | CC-3-2 | 8.5 |
| III | CLY-3-O2 | 8 |
| III | CLY-4-O2 | 6 |
| III | CLY-3-O3 | 6 |
| IV | COY-3-O2 | 8 |
| V | CPP-3-2 | 5.5 |
| VII | PY-3-O2 | 11 |
| IX | CPY-3-O2 | 10 |
| IX | CPY-2-O2 | 7 |

$\Delta\epsilon$[1 KHz, 25° C.]: −3.6
$\Delta$n[589 nm, 25° C.]: 0.103
Cp: 80° C.
$\gamma_1$: 85 mPa · s
$K_{11}$: 12.5
$K_{33}$: 13.7

Replace CC-3-V1 in Example 2 with CC-3-2 as Comparative Example 1, and adjust the clearing point of Comparative Example 1 to be the same as Example 2. Compared with Comparative Example 1, the liquid crystal composition of Example 2 of the present invention has appropriate clearing point (Cp), optical anisotropy (Δn), and large dielectric anisotropy (Δεs), lower rotational viscosity ($\gamma_1$), and higher elastic constant (K), which can be used to develop low threshold voltage, fast response liquid crystal display.

Example 3

The formulation and corresponding properties of the liquid crystal composition are as shown in table 6 below.

TABLE 6

Formulation and corresponding properties of liquid crystal composition of Example 3

| Category | Liquid crystal monomer code | Content (%) |
|---|---|---|
| I | CC-3-V | 35.5 |
| II | CC-3-V1 | 4.5 |
| III | CLY-3-O2 | 8 |
| III | CLY-4-O2 | 6 |
| III | CLY-3-O3 | 6 |
| IV | COY-3-O2 | 8 |
| V | CPP-3-2 | 3 |
| VII | PY-3-O2 | 12 |
| IX | CPY-3-O2 | 10 |
| IX | CPY-2-O2 | 7 |

$\Delta\epsilon$[1 KHz, 25° C.]: −3.8
$\Delta$n[589 nm, 25° C.]: 0.104
Cp: 81° C.
$\gamma_1$: 80 mPa · s
$K_{11}$: 13.5
$K_{33}$: 14.9

Comparative Example 2

The formulation and corresponding properties of the liquid crystal composition are as shown in table 7 below.

TABLE 7

Formulation and corresponding properties of liquid crystal composition of Comparative Example 2

| Category | Liquid crystal monomer code | Content (%) |
|---|---|---|
| I | CC-3-V | 34 |
| II | CC-3-V1 | 4.5 |
|  | CCY-3-O2 | 8 |
|  | CCY-4-O2 | 6 |
|  | CCY-3-O1 | 6 |
| IV | COY-3-O2 | 8 |
| V | CPP-3-2 | 4.5 |
| VII | PY-3-O2 | 12 |
| IX | CPY-3-O2 | 10 |
| IX | CPY-2-O2 | 7 |

$\Delta\epsilon$[1 KHz, 25° C.]: −3.4
$\Delta$n[589 nm, 25° C.]: 0.100
Cp: 81° C.
$\gamma_1$: 90 mPa · s
$K_{11}$: 12.8
$K_{33}$: 14.1

The CLY monomers such as CLY-3-O2 in Example 3 were replaced with CCY monomers such as CCY-3-O2 as Comparative Example 2, and the clearing point of Comparative Example 2 was adjusted to be the same as Example 3. Compared with Comparative Example 2, the liquid crystal composition of Example 3 of the present invention has an appropriate clearing point (Cp), and has a larger dielectric anisotropy (Δε), a lower rotational viscosity, a higher elastic constant K, and optical properties. The anisotropy (Δn) is higher and can be used to develop low-threshold voltage, fast-response liquid crystal displays.

Example 4

The formulation and corresponding properties of the liquid crystal composition are as shown in table 8 below.

TABLE 8

Formulation and corresponding properties of liquid crystal composition of Example 4

| Category | Liquid crystal monomer code | Content (%) |
|---|---|---|
| I | CC-3-V | 36 |
| II | CC-3-V1 | 7 |
| III | CLY-3-O2 | 8 |
| III | CLY-4-O2 | 6 |
| III | CLY-3-O3 | 6 |
| IV | COY-3-O2 | 5 |
| VII | PY-3-O2 | 10 |
| VIII | Sc-CpO-O4 | 5 |
| IX | CPY-3-O2 | 10 |
| IX | CPY-2-O2 | 7 |

Δε[1 KHz, 25° C.]: −4.1
Δn[589 nm, 25° C.]: 0.104
Cp: 81° C.
$\gamma_1$: 79 mPa · s
$K_{11}$: 14.0
$K_{33}$: 14.9

Comparative Example 3

The formulation and corresponding properties of the liquid crystal composition are as shown in table 9 below.

TABLE 9

Formulation and corresponding properties of liquid crystal composition of Comparative Example 3

| Category | Liquid crystal monomer code | Content (%) |
|---|---|---|
| I | CC-3-V | 36 |
| II | CC-3-V1 | 7 |
| III | CLY-3-O2 | 8 |
| III | CLY-4-O2 | 6 |
| III | CLY-3-O3 | 6 |
|  | CY-3-O2 | 5 |
| VII | PY-3-O2 | 10 |
| VIII | Sc-CpO-O4 | 5 |
| IX | CPY-3-O2 | 10 |
| IX | CPY-2-O2 | 7 |

Δε[1 KHz, 25° C.]: −3.6
Δn[589 nm, 25° C.]: 0.103
Cp: 81° C.
$\gamma_1$: 85 mPa · s
$K_{11}$: 13.3
$K_{33}$: 13.9

The COY-3-O2 in Example 4 was replaced with CY-3-O2, and the rest was the same as Example 4, which served as Comparative Example 3. Compared with Comparative Example 3, the liquid crystal composition of Example 4 of the present invention has appropriate optical anisotropy (Δn), clearing point (Cp), higher dielectric anisotropy (Δεs), and lower rotational viscosity ($\gamma_1$) The elastic constant (K) value is larger, which can be used to develop low threshold voltage and fast response liquid crystal displays.

Example 5

The formulation and corresponding properties of the liquid crystal composition are as shown in table 10 below.

TABLE 10

Formulation and corresponding properties of liquid crystal composition of Example 5

| Category | Liquid crystal monomer code | Content (%) |
|---|---|---|
| I | CC-3-V | 34 |
| II | CC-3-V1 | 6 |
| III | CLY-3-O2 | 5 |
| III | CLY-4-O2 | 5 |
| IV | COY-3-O2 | 10 |
| V | CCP-V-1 | 8 |
| VII | PY-3-O2 | 10 |
| VIII | Sc-CpO-O4 | 5 |
| IX | CPY-3-O2 | 10 |
| IX | CPY-2-O2 | 7 |

Δε[1 KHz, 25° C.]: −3.9
Δn[589 nm, 25° C.]: 0.100
Cp: 76° C.
$\gamma_1$: 69 mPa · s
$K_{11}$: 13.5
$K_{33}$: 14.9

Comparative Example 4

The formulation and corresponding properties of the liquid crystal composition are as shown in table 11 below.

TABLE 11

Formulation and corresponding properties of liquid crystal composition of Comparative Example 4

| Category | Liquid crystal monomer code | Content (%) |
|---|---|---|
| I | CC-3-V | 34 |
| II | CC-3-V1 | 6 |
|  | CLY-1V-O2 | 5 |
|  | CLY-V2-O2 | 5 |
| IV | COY-3-O2 | 10 |
| V | CCP-V-1 | 8 |
| VII | PY-3-O2 | 10 |
| VIII | Sc-CpO-O4 | 5 |
| IX | CPY-3-O2 | 10 |
| IX | CPY-2-O2 | 7 |

Δε[1 KHz, 25° C.]: −3.2
Δn[589 nm, 25° C.]: 0.102
Cp: 75° C.
$\gamma_1$: 85 mPa · s
$K_{11}$: 12.5
$K_{33}$: 13.5

The CLY-3-O2 and CLY-4-O2 in Example 5 were replaced with CLY-1V2O2 and CLY-V2-O2, and the rest were the same as in Example 5, which served as Comparative Example 4. Compared with Comparative Example 4, the liquid crystal composition of Example 5 of the present invention has appropriate optical anisotropy (Δn), clearing point (Cp), higher dielectric anisotropy (Δεs), and lower rotational viscosity ($\gamma_1$), the elastic constant (K) is larger, which can be used to develop low-threshold voltage, fast-response liquid crystal displays.

Example 6

The formulation and corresponding properties of the liquid crystal composition are as shown in table 12 below.

TABLE 12

Formulation and corresponding properties of liquid crystal composition of Example 6

| Category | Liquid crystal monomer code | Content (%) |
|---|---|---|
| I | CC-3-V | 34 |
| II | CC-3-V1 | 6 |
| III | CLY-3-O2 | 5 |
| III | CLY-4-O2 | 5 |
| IV | COY-3-O2 | 10 |
| IV | CCOY-3-O2 | 5 |
| V | CPP-1V-2 | 8 |
| VII | PY-3-O2 | 5 |
| VIII | Sc-CpO-O4 | 5 |
| IX | CPY-3-O2 | 10 |
| IX | CPY-2-O2 | 7 |

Δε[1 KHz, 25° C.]: −4.1
Δn[589 nm, 25° C.]: 0.108
Cp: 85° C.
γ$_1$: 83 mPa · s
K$_{11}$: 14.7
K$_{33}$: 14.9

Obviously, the above-mentioned examples of the present disclosure are only for the purpose of clearly explaining the examples of the present disclosure, rather than limiting the implementation mode of the present disclosure. For ordinary technical personnel in the art, other changes or changes in different forms can be made on the basis of the above description. Here, it is impossible to enumerate all the examples, and all the technologies belong to the present disclosure The obvious changes or changes in the technical scheme are still within the scope of protection of the present disclosure.

The invention claimed is:

1. A dielectric negative liquid crystal composition, comprising a compound of formula I, a compound of formula II, three different compounds of formula III, one or more compounds of formula IV, a compound of formula VII-3, and two different compounds of formula IX-1:

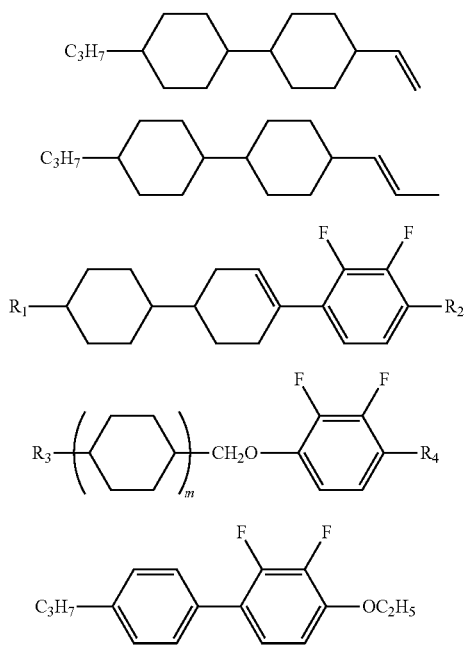

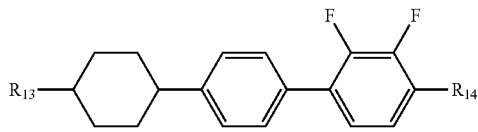

wherein $R_1$ represents an alkyl group having a carbon atom number of 3-4;

$R_2$ represents an alkoxy group having a carbon atom number of 2-3;

$R_3$ and $R_4$ each independently represent an alkyl group having a carbon atom number of 1-5, a fluoro-substituted alkyl group having a carbon atom number of 1-5, an alkoxy group having a carbon atom number of 1-5, or a fluoro-substituted alkoxy group having a carbon atom number of 1-5;

$R_{13}$ represents an alkyl group having a carbon atom number of 2-3;

$R_{14}$ represents an alkoxy group having a carbon atom number of 2;

m represents 1;

a mass content of the compound represented by formula I is 35.5-36%, a mass content of compound represented by formula II is 4.5-7%, a mass content of the compounds represented by formula III is 20%, a mass content of the compounds represented by formula IV is 5-8%, a mass content of the compound represented by formula VII-3 is 10-12%, and a mass content of the compounds represented by formula IX-1 is 17%.

2. The liquid crystal composition according to claim 1, wherein the compound of formula III is selected from the group consisting of compounds of formula III-1 to III-3.

3. The liquid crystal composition according to claim 1, wherein the compound of formula IV is selected from the group consisting of compounds of formula IV-1, IV-3 and IV-5:

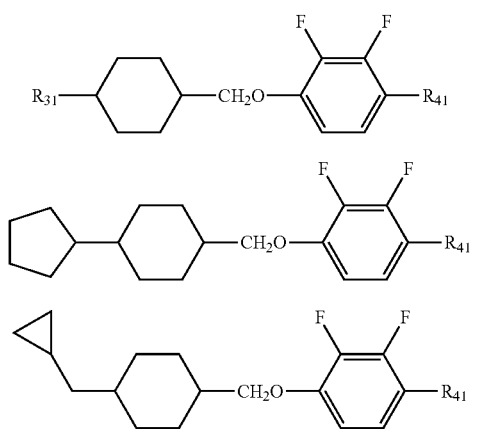

IV-1

IV-3

IV-5 wherein $R_{31}$ and $R_{41}$ each independently represent an alkyl group having a carbon atom number of 1-5 or an alkoxy group having a carbon atom number of 1-5.

4. The liquid crystal composition according to claim 1, wherein the liquid crystal composition further comprises one or more compounds of formula V:

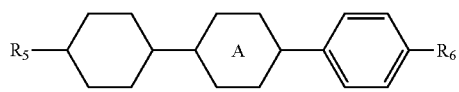

V wherein $R_5$ and $R_6$ each independently represent an alkyl group having a carbon atom number of 1-5, an alkoxy group having a carbon atom number of 1-5, or an alkenyl group having a carbon atom number of 2-5;

represents

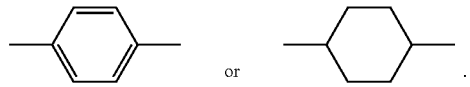

5. The liquid crystal composition according to claim 1, wherein the liquid crystal composition further comprises one or more compounds of formula VI:

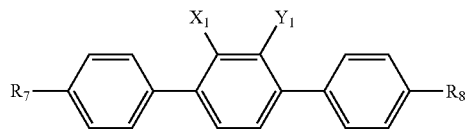

VI wherein $R_7$ and $R_8$ each independently represent an alkyl group having a carbon atom number of 1-5, an alkoxy group having a carbon atom number of 1-5, or an alkenyl group with having a carbon atom number of 2-5;

$X_1$ and $Y_1$ each independently represent H or F.

6. The liquid crystal composition according to claim 1, wherein the liquid crystal composition further comprises one or more compounds of formula VIII:

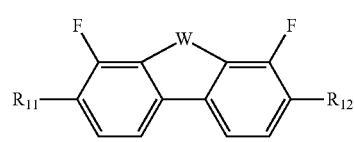

VIII wherein $R_{11}$ represents an alkyl group having a carbon atom number of 1-5, an alkoxy group having a carbon atom number of 1-5, or an alkenyl group having a carbon atom number of 2-5, any one or more non-connected $CH_2$ may be substituted with cyclopentyl, cyclobutyl or cyclopropyl;

$R_{12}$ represents an alkyl group having a carbon atom number of 1-5, an alkoxy group having a carbon atom number of 1-5, or an alkenyl group having a carbon atom number of 2-5;

W represents O or S.

7. The liquid crystal composition according to claim 1, wherein the liquid crystal composition further comprises one or more compounds of formula X other than the compounds of formula I and formula II:

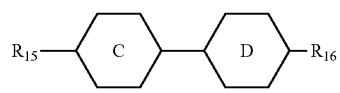

X wherein $R_{15}$ and $R_{16}$ each independently represent an alkyl group having a carbon atom number of 1-5, an alkoxy group having a carbon atom number of 1-5, or an alkenyl group having a carbon atom number of 2-5;

 and 

each independently represent

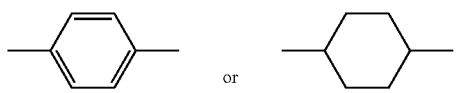

8. A liquid crystal display element or liquid crystal display, wherein the liquid crystal display element or liquid crystal display comprises the liquid crystal composition of claim 1, the liquid crystal display element or liquid crystal display is an active matrix display element or display or a passive matrix display element or display.

* * * * *